US008604380B2

(12) United States Patent
Howerton et al.

(10) Patent No.: US 8,604,380 B2
(45) Date of Patent: Dec. 10, 2013

(54) METHOD AND APPARATUS FOR OPTIMALLY LASER MARKING ARTICLES

(75) Inventors: Jeffrey Howerton, Portland, OR (US); Robert Reichenbach, Portland, OR (US); Mehmet Alpay, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 179 days.

(21) Appl. No.: 12/859,498

(22) Filed: Aug. 19, 2010

(65) Prior Publication Data

US 2012/0043306 A1     Feb. 23, 2012

(51) Int. Cl.
*B23K 26/00*     (2006.01)

(52) U.S. Cl.
USPC .............. 219/121.6; 219/121.61; 219/121.69; 219/121.72

(58) Field of Classification Search
USPC ............... 219/121.6, 121.61, 121.68, 121.69, 219/121.72, 121.73; 216/65
See application file for complete search history.

(56) References Cited

U.S. PATENT DOCUMENTS

| | | | |
|---|---|---|---|
| 5,539,175 A | 7/1996 | Smith et al. | |
| 6,433,301 B1 | 8/2002 | Dunsky | |
| 6,922,286 B2 * | 7/2005 | Brown | 359/566 |
| 7,369,152 B2 * | 5/2008 | Endo et al. | 347/262 |
| 2003/0127439 A1 | 7/2003 | Wee et al. | |
| 2004/0232341 A1 * | 11/2004 | Miyamoto | 250/358.1 |
| 2004/0241556 A1 * | 12/2004 | Bellman et al. | 430/5 |
| 2005/0224578 A1 * | 10/2005 | Addington et al. | 235/454 |
| 2005/0271095 A1 * | 12/2005 | Smart | 372/26 |
| 2007/0272667 A1 | 11/2007 | Lei et al. | |
| 2008/0073438 A1 * | 3/2008 | Gu et al. | 235/494 |
| 2008/0141880 A1 * | 6/2008 | Daniel et al. | 101/327 |
| 2008/0152859 A1 | 6/2008 | Nagai | |
| 2010/0141729 A1 * | 6/2010 | Petsch et al. | 347/225 |
| 2010/0147418 A1 | 6/2010 | Piana | |
| 2010/0273313 A1 * | 10/2010 | Urairi et al. | 438/463 |
| 2011/0193928 A1 | 8/2011 | Zhang | |

FOREIGN PATENT DOCUMENTS

| | | |
|---|---|---|
| JP | 60-204392 | 10/1985 |
| JP | 04-307288 | 10/1992 |
| JP | 06-21124 | 3/1994 |
| JP | 2002-370457 A | 12/2002 |
| JP | 2005-186153 A | 7/2005 |

OTHER PUBLICATIONS

Brygo, F., et al.; Laser fluence, repetition rate and pulse duration effects on paint ablation; Applied Surface Science, vol. 252, Iss. 6, Jan. 2006, pp. 2131-2138; Elsevier, Amsterdam, NL.
ESI; Model ML5900 Precision Laser machining System Service Guide; Part No. 1178472A; Oct. 2009; Electro Scientific Industries, Inc., Portland OR 97229.
Written Opinion of PCT/US2011/054638, 4 pages.

* cited by examiner

*Primary Examiner* — Hsien Ming Lee

(57) ABSTRACT

The invention is a method and apparatus for laser marking a stainless steel specimen with commercially desirable marks. The method includes providing a laser processing system having a laser, laser optics and a controller with pre-determined laser pulse parameters, selecting the pre-determined laser pulse parameters associated with the desired mark, and directing the laser marking system to produce laser pulses having laser pulse parameters associated with the desired marks including temporal pulse widths greater than about 1 and less than about 1000 picoseconds.

18 Claims, 7 Drawing Sheets

METHOD AND APPARATUS FOR OPTIMALLY LASER MARKING ARTICLES

TECHNICAL FIELD

The present invention relates to laser marking articles. In particular it relates to laser marking articles by laser ablating a coating applied to the article which reveals the surface of the article underneath, thereby forming the mark by the contrasting appearance between the revealed surface of the article and the adjacent remaining coating. The mark may also be formed by laser ablating the first or topmost coating layer to reveal a second coating layer underneath forming the mark by the contrast between the revealed second coating and adjacent first coating. Laser parameters are selected to provide uniform, commercially desirable appearance and avoid damage to the underlying surface while maintaining acceptable system throughput.

BACKGROUND OF THE INVENTION

Marketed products commonly require some type of marking on the product for commercial, regulatory, cosmetic or functional purposes. A mark is defined as contiguous region or area on the surface of the article which contrasts visually with the adjacent surface. Desirable attributes for marking include consistent appearance, durability, and ease of application. Appearance refers to the ability to reliably and repeatably render a mark with a selected shape and uniform color and optical density. Durability is the quality of remaining unchanged in spite of abrasion to the marked surface. Ease of application refers to the cost in materials, time and resources of producing a mark including programmability. Programmability refers to the ability to program the marking device with a new pattern to be marked by changing software as opposed to changing hardware such as screens or masks.

Of particular interest is creating marks on coated or painted articles. Articles made of metal or various types of plastics are often painted or otherwise covered in various industrial coatings to protect and change the appearance of the article's surface. Laser ablating the coating in particular patterns to remove the coating and reveal the surface of the article underneath is a desirable way to create a mark on article. Covering an article with two or more layers of coatings and laser ablating a first coating to reveal a second coating underneath is another desirable way to create marks. Marking a product by removing a coating with a laser to reveal the article underneath is discussed in US patent application no. 2008/0152859, inventor Masanori Nagai, published Jun. 26, 2008. This method depends upon the brightness of the coating being brighter than the surface of the article. Japanese patent application no. 03-150842, inventor Iwasaki Noboru, published Oct. 29, 1992, describes removing one or more coating layers with a laser to reveal a coating layer underneath.

One thing that these references have in common is that in order to remove a coating without removing materials beneath the coating layer being removed, the laser ablation threshold for the material being removed must be lower than the laser ablation threshold of the material underneath. Laser ablation threshold is the minimum energy required to cause removal of material. This removal may be ablative, where enough energy is put into the material by the laser to cause the material to disassociate into plasma, or thermal, where the material is essentially melted and vaporized, or a combination of the two. Related to the ablation threshold is the damage threshold. The damage threshold is the minimum laser energy required to cause an undesirable change in the appearance of the material. The damage threshold for materials is generally lower and sometimes much lower than the ablation threshold. We define damage as any undesirable change in the appearance of the materials that comprise the article or under lying coating following laser removal of the topmost layer.

FIG. 1 shows an exemplary prior art tool path for marking an article. Tool path refers to the sequence of locations on an article which will be exposed to laser radiation in order to create the mark. This laser radiation can be continuous wave (CW) or pulsed. In either case, the laser and optical system will have a laser beam, which is the optical path along which laser energy, either pulsed or CW, travels when the laser is energized to emit radiation. FIG. 1 shows an article 10, coated with an opaque coating 11. A shape 12 outlines the area where material is to be removed to form the mark. A tool path 13 is laid out for a laser to begin removing material at the start point 14. The laser beam is then moved in relation to the article 10 along the tool path 13, removing material until reaching the end point 16. This tool path is optimized in the sense that the tool path is configured to maximize the amount of time the laser spends actually removing material, as opposed to positioning the laser beam without cutting. FIG. 2 shows the results of removing material as shown in FIG. 1. The article 20, with a coating 21 has had the coating removed from the area of the mark 22, exposing material underneath 24, 26. In this case, the laser irradiance has been selected to optimize material removal rates for the portion of the "T" shape that forms the vertical portion 24. Irradiance is the rate at which laser energy is applied to the surface of the article per unit area and is measured in Watts/cm$^2$. This irradiance causes damage or undesirable appearance to the other portions of the "T" shape 26, resulting in unacceptable appearance of the mark. The prior art solution to this problem is to reduce slow down the movement of the laser with respect to the article or reduce the irradiance, both of which reduce throughput and are hence undesirable.

What is desired but undisclosed by the art is a reliable and repeatable method for removing material that does not damage under laying materials in cases where the ablation threshold for the material to be removed is close to or lower than the damage threshold of the under laying material, or where the damage threshold changes because of previous laser processing. What is needed then is a method for reliably and repeatably creating marks having a desired appearance on coated articles using a laser to remove a layer of coating without causing undesired damage to the under laying materials while maintaining acceptable system throughput.

SUMMARY OF THE INVENTION

Aspects of this invention create a mark with desired properties on coated articles using a laser marking system. The laser marking system has data storage and controllable laser fluence. Fluence is defined as the cumulative laser energy applied per unit area and is measured in Joules/cm$^2$. Aspects of this invention determine a first laser fluence associated with creating a mark with desired properties on a first portion of the mark. Aspects of this invention then determine a second laser fluence associated with creating a mark with desired properties on a second portion of the mark. These fluences are then stored in the laser marking system's storage. The laser marking system is then directed to mark the article using the stored first laser fluence in the first portion of the mark and using the stored second laser fluence in a second portion of the mark thereby marking the article with desired properties.

Creating marks on a coated article by ablating a top coating layer to reveal an under layer which may be another coating or the surface of the article requires that the ablation threshold for the material to be ablated be lower than the ablation threshold for the material underneath. In most cases this can be arranged by appropriate selection of materials. For example, a topmost coating or paint that is darker, or less reflective than the under layer will absorb more laser energy and typically will ablate at a lower fluence threshold than the under layer.

Aspects of this invention consider damage thresholds when marking in order to create marks with desirable appearance. In order to create marks efficiently, irradiance is adjusted to maximize material removal rates without damaging underlying materials. The irradiance combined with the tool path determines the fluence, since the irradiance measures the rate at which energy is applied to the surface of the article and the tool path indicates how much time the laser beam will directed to each point on the mark. The irradiance and tool path of the laser beam is calculated to be above the ablation threshold of the material to be removed and below the damage threshold of the underlying material while maximizing the rate of travel of the laser beam with respect to the article in order to maximize throughput. The difficulty is that these thresholds can be different for different areas of the mark at different times during the marking process. Laser parameters which provide commercially desirable appearance and acceptable rate of material removal and hence throughput in one area of the mark may damage the underlying material in another area of the mark. FIG. 2 shows the results of laser marking an article with a single irradiance and rate of travel, wherein the results are uneven and commercially unacceptable. Choosing a single set of laser parameters which results in commercially desirable appearing mark may be possible but the resulting rate of material removal must not exceed the fastest acceptable removal rate for the all portions of the mark, resulting in unacceptably low throughput. Aspects of this invention determine laser parameters to use in creating commercially desirable marks by dividing the area to be marked into smaller regions and calculating laser parameters for each region which optimize the rate of material removal for each of the regions of the mark depending upon the shape of the mark and the properties of the laser pulses used.

The damage threshold for a material at a particular location is not only dependent upon the laser irradiance being currently directed at the location but also on the recent history of exposure to laser radiation. Therefore simply measuring laser fluence will not properly predict the appearance of the material following laser processing. This is because previous irradiation of the location or nearby locations will tend to heat the material. This heating can have a time constant for cooling which may exceed the time between passes of the laser beam and therefore upon subsequent passes of the laser, the material may retain heat from a previous pass thereby lowering the damage threshold for that particular location at that particular time. Aspects of the current invention calculate this residual heating based on the shape of the mark and the planned geometry and timing of the laser pulses to be used to ablate the topmost material. Based on the calculated residual heating, aspects of this invention alter the laser fluence to compensate for the decreased damage threshold caused by previous laser irradiation. This alteration is dependent upon the specific region of the mark being processed, the previous laser irradiation on or near this region and the latency since the previous irradiation.

Aspects of this invention control various laser parameters including laser pulse parameters such as pulse duration or pulse repletion rate, or tool path parameters such as spot size, laser beam location, laser beam speed in order to increase throughput of a laser marking system while avoiding damage to underlying materials. A laser is selected and the power, rep rate, pulse temporal shape and pulse duration are selected to provide desired material removal rates. A tool path, or locations and times at which the laser will irradiate the article to form the mark, is then calculated to provide the desired material removal rate while avoiding damage to the underlying material. One tool path calculation is the spacing between subsequent pulses on the article which is controlled by changing the speed of the relative motion between the laser pulses and the article. Another tool path calculation is spot size which controls the irradiance by moving the focal spot in the Z axis to point above or below the surface of the article. A further tool path calculation calculates the spacing between adjacent rows of pulse locations. A tool path is selected which will cover the area to be marked in lines to be traveled in a raster fashion. The set of lines to be traveled is divided into subsets and the thermal loading of the laser marking is determined for each region. The thermal loading can be calculated, estimated or measured empirically. Laser irradiance is then adjusted by altering the laser parameters based on the determined thermal load for each subset.

Aspects of this invention control the output of the laser. In order to facilitate application of tool paths as selected by this invention, laser pulses should be turned on and off very precisely under the control of the laser marking system. Aspects of this invention control the laser irradiance with sufficient precision to permit tool paths which create marks with commercially desirable uniformity, color, texture and shape. An optical switch is used to switch the laser beam on and off rapidly without requiring the laser to be turned off and on. Aspects of this invention use an acousto-optic modulator (AOM) to modulate the beam precisely and quickly and thereby direct the beam either to impinge the article or travel harmlessly to a beam dump.

Aspects of this invention are implemented by adapting an existing laser micromachining system, the ESI Model ML5900 Laser Micromachining System, manufactured by Electro Scientific Industries, Inc., Portland, Oreg. 97229. This system is described in detail in the "ESI Service Guide ML5900", part number 178472A, published October 2009, Electro Scientific Industries, Inc., Portland, Oreg. 97229, and is included herein in its entirety by reference. Adaptations include addition of an electro-optic device to permit more precise control of laser fluence in real time along with software to control these changes in fluence.

Another aspect of this invention relies upon an infrared (IR) camera focused on the article to measure the temperature of the article as it is being marked. The infrared camera detects the heat emitted from the surface of the article in an area to be marked and communicates this information to the controller which adjusts the laser fluence to compensate for the heat remaining in the article. The IR camera is calibrated so that for a particular article with particular coatings applied, a given reading from the IR camera will indicate what fluence to use to remove the topmost coating without causing undesired damage to the underlying materials, thereby creating a mark with desirable appearance.

To achieve the foregoing with these and other aspects in accordance with the purposes of the present invention, as embodied and broadly described herein, a method for creating a visible mark with desirable commercial qualities on a coated article and apparatus adapted to perform the method is disclosed herein. Included is a laser processing system having a laser, laser optics, and motion stages all operatively connected to a controller with stored, predetermined laser pulse parameters. Stored laser pulse parameters associated with the desired fluence can be selected depending upon which region of the mark is being processed to create marks with commercially desirable properties.

DETAILED DESCRIPTION OF PREFERRED EMBODIMENTS

An embodiment of this invention creates a mark with desired properties on coated articles using a laser marking system. The laser marking system has data storage and controllable laser fluence or dose. Embodiments of this invention determine a first laser fluence associated with creating a mark with desired properties on a first portion of the mark. Aspects of this invention then determine a second laser fluence associated with creating a mark with desired properties on a second portion of the mark. These fluences are then stored in the laser marking system's data storage. The laser marking system is then directed to mark the article using the stored first laser fluence in the first portion of the mark and using the stored second laser fluence in a second portion of the mark thereby marking the article with desired properties. Embodiments of this invention control laser fluence by controlling various laser parameters including laser pulse parameters such as pulse duration or pulse repletion rate, and tool path parameters such as spot size, laser beam location, or laser beam speed in order to increase throughput of a laser marking system while avoiding damage to underlying materials. Typically, a laser is selected and the power, rep rate, pulse temporal shape and pulse duration are selected to provide desired material removal rates. A tool path is then calculated to provide the desired material removal rate while avoiding damage to the underlying material.

One tool path calculation is the spacing between subsequent pulses on the article which is controlled by changing the speed of the relative motion between the laser beam and the article. Another tool path calculation is spot size which controls the irradiance by moving the focal spot in the Z axis to point above or below the surface of the article. A further tool path calculation calculates the spacing between adjacent rows of pulse locations. A tool path is selected which will cover the area to be marked in lines to be traveled in a raster fashion. The set of lines to be traveled is divided into subsets and the thermal loading of the laser marking is determined for each region. The thermal loading can be calculated, estimated or measured empirically. Laser irradiance is then adjusted by altering the laser parameters based on the determined thermal load for each subset.

Embodiments of this invention control the output of the laser. In order to facilitate tool paths as selected by this invention, laser pulses should be turned on and off very precisely under the control of the laser marking system. Aspects of this invention control the laser irradiance with sufficient precision to permit tool paths which create marks with commercially desirable uniformity, color, texture and shape. Aspects of this invention use an acousto-optic modulator (AOM) to modulate the beam precisely and quickly and thereby direct the beam either to impinge the article or travel harmlessly to a beam dump.

Figure 1:
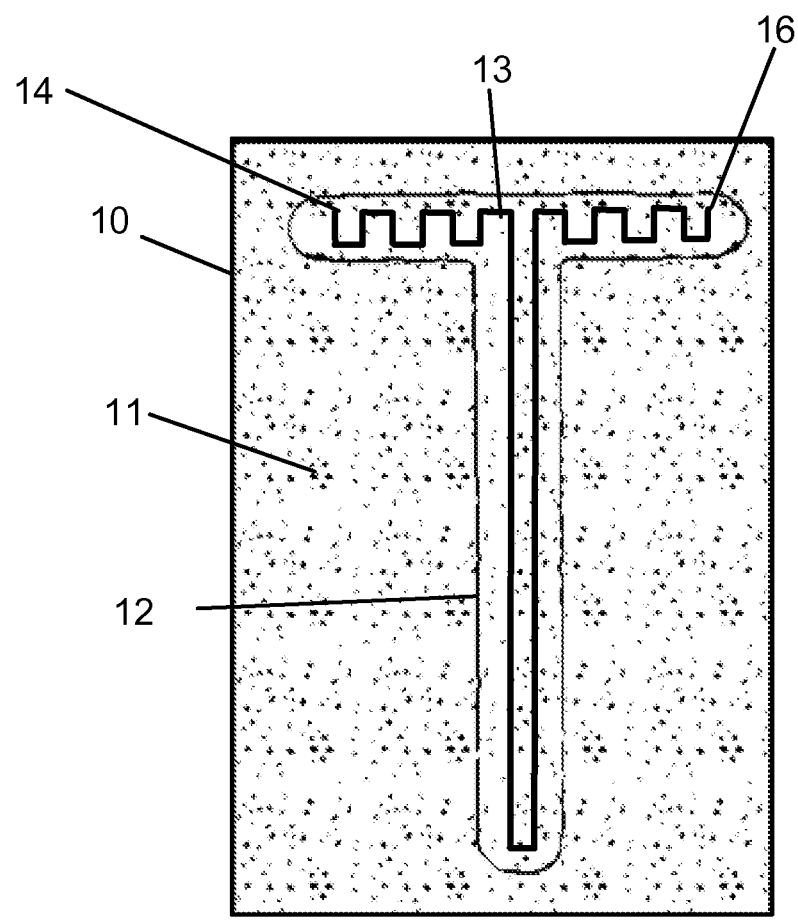
FIG. 1 Prior art marking
FIG. 2 Prior art mark
FIG. 3 Mark showing calculated fluence areas
FIG. 4 Adapted laser marking system
FIG. 5 Adapted laser marking system
FIG. 6 Adapted laser marking system
FIG. 7 Adapted laser marking system
Figure 2:
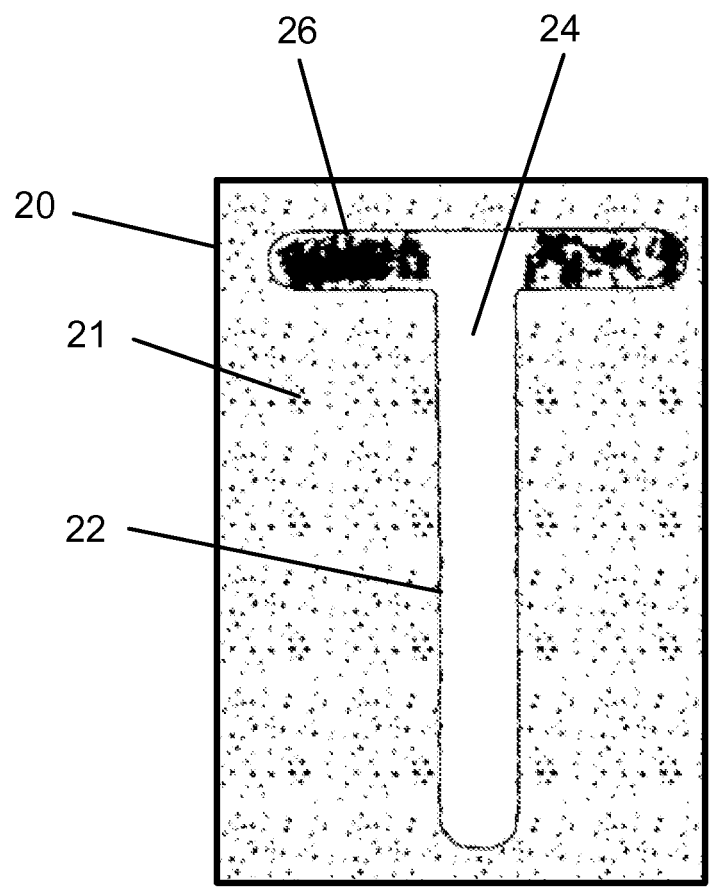
Figure 3:
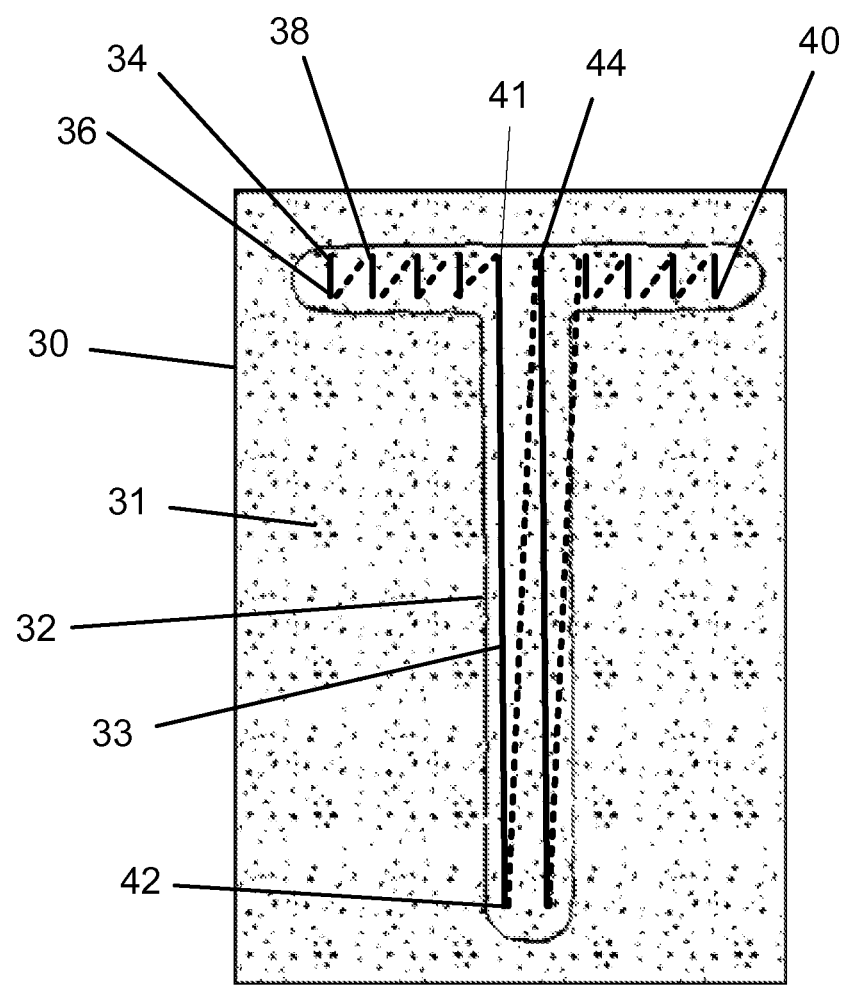

FIG. 3 shows an improved tool path employed by embodiments of this invention. An article 30 is coated with a coating 31 to be removed within a shaped area 32. The laser begins removing material along the tool path 33 at its start point 34 and removes material as it moves to point 36, represented by the solid line. At point 36 the laser is turned off and the laser marking system re-positions the article with respect to the laser beam so that when the laser turns on, it begins removing material at point 38, represented by the dotted line. The laser then proceeds to cut and re-position until the end point 40 is reached. Removing material in a raster scan fashion means that for adjacent tool path lines of similar length, the temperature of the material being laser machined will be constant, since the delay between laser machining adjacent points is constant. This assumes that the rate of travel of the laser beam with respect to the article is constant.

Although the temperature rise is constant along lines with this tool path scheme, different length lines, differing re-trace times or line breaks will provide differing temperature rises and therefore potentially different appearance of the underlying material. For example, the amount of time it takes for the laser to move from a start point 34, remove material to the end of the stroke 36, and then reposition to start the next stroke 38 differs from the time it takes to start removing material at the top of a longer stroke 41, remove material to the end of the stroke 42 and then reposition to the top of the next stroke 44. Since the times differ, the temperature at point 38 will differ from the temperature of the material at point 44 when the laser begins removing material, potentially causing the underlying material to have undesirable differing appearances at these points.

Figure 4:
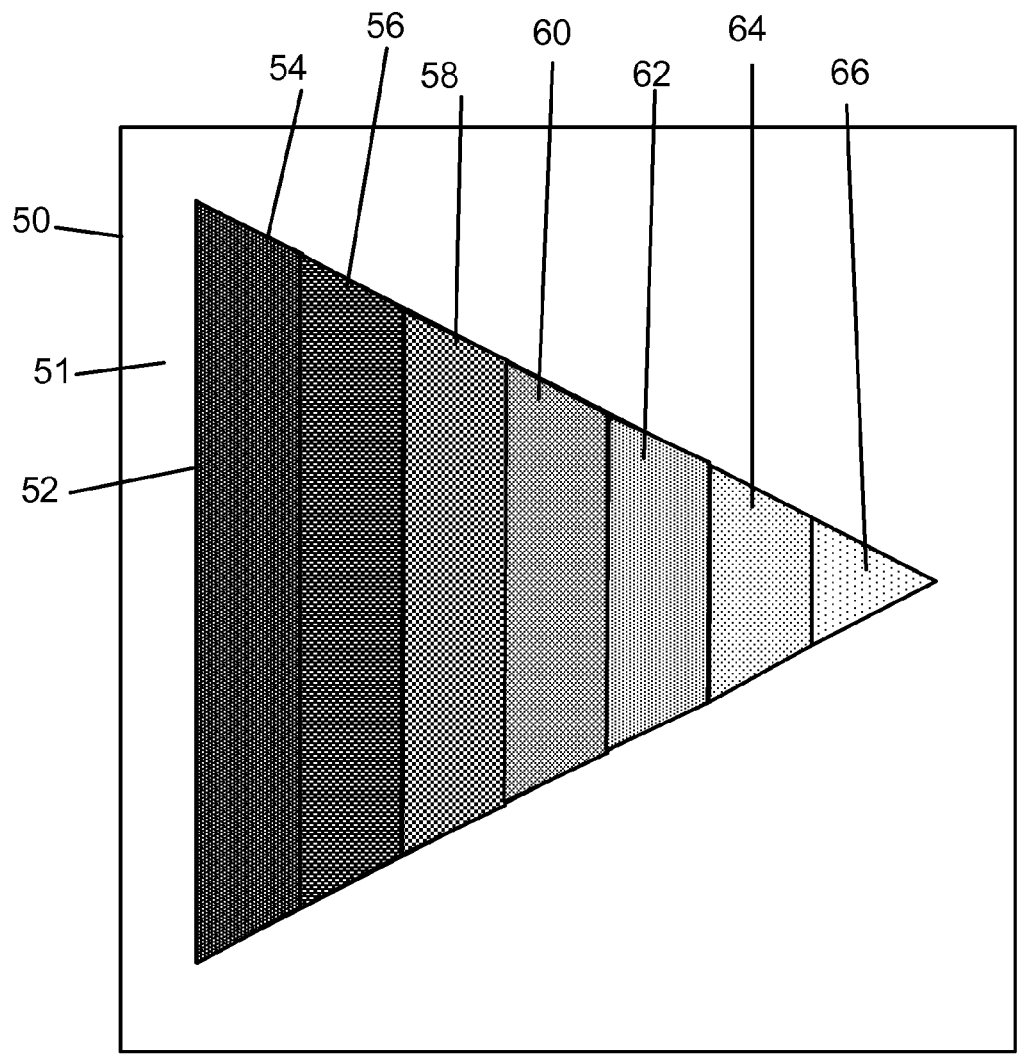
Figure 5:
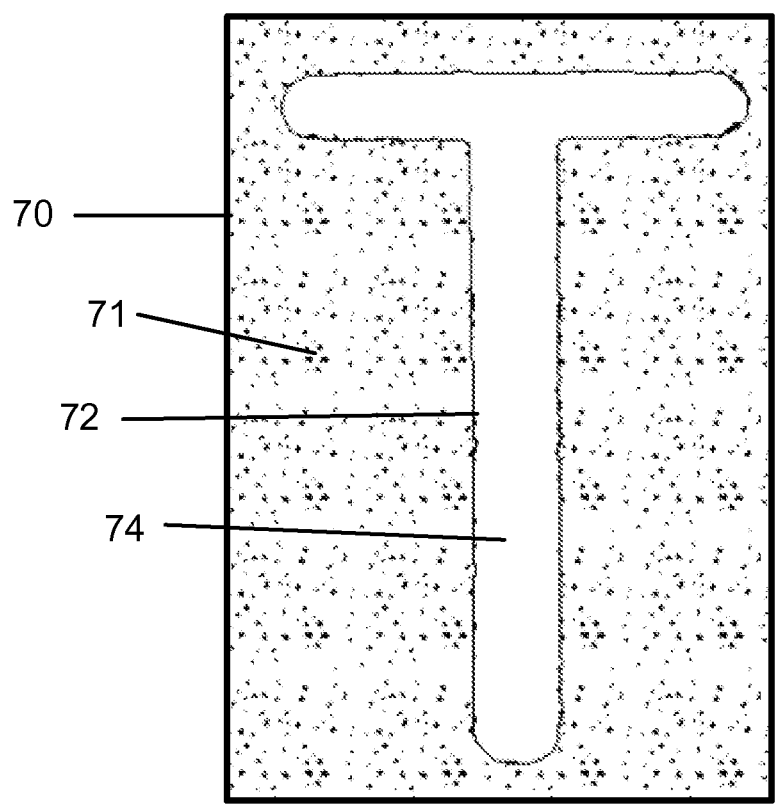

Embodiments of this invention solve this problem by dividing the tool path into regions, based on the length of the strokes to be machined. FIG. 4 shows an article 50, coated with a coating 51 with a mark 52 to be laser machined. The strokes are intended to be a vertical raster as shown in FIG. 3. The mark is divided up into regions 54, 56, 58, 60, 63, 64, 66 which have similar adjacent stroke of about the same length. For each stroke length group, a laser fluence is selected that can remove material at the desired rate while compensating for the predicted rise in temperature caused by adjacent strokes. Thus the fluence will be lower for region 66, for example, than region 64, since the strokes are shorter and the temperature will be higher due to the decreased time between strokes. The lines are able to be grouped due to tolerances in laser/material interaction. Even though the temperatures may differ by a small amount between machining strokes within a group, similar laser fluences will have similar effects on the material. In this example, the first region 54 will be machined at one laser fluence, then when the machining moves to the next region 56, the fluence is reduced to provide the same appearance of the underlying material while maintaining acceptable throughput. This proceeds, with the laser fluence being adjusted for each of the remaining regions 58, 60, 62, 64 66. FIG. 5 shows the results of applying an embodiment of this invention to creating a mark 72 on a coated article 70, covered with a coating 71. Note that the underlying material 74 visible in the mark 72 shows no sign of damage or uneven appearance, a desirable result.

Embodiments of this invention control the rate of material removal and the subsequent appearance of underlying materials by controlling laser fluence. Laser fluence can be controlled by controlling laser output energy, beam size, shape or pulse duration. However, it is typically more desirable to control tool path parameters such as speed or pitch between lines to maintain maximal material removal rates. One simple way to maintain even appearance of the underlying material is to stop between strokes to allow the material to cool completely before machining the next stroke. Testing on sample articles indicates that about a 10 millisecond delay between strokes is required to allow the material to cool sufficiently to avoid damage. Inserting this delay provides uniform appearance but slows the process unacceptably. Embodiments of this invention use changes in tool path parameters such as speed, spot size and pitch in addition to laser pulse parameters to control the laser fluence (e.g. in a range from $1.0 \times 10^{-6}$ Joules/cm$^2$ to 1.0 Joules/cm$^2$) precisely and accurately to create marks in coated materials with commercially desirable color, optical density, uniformity, texture and shape. Embodiments of this invention use an acousto optical modulator (AOM) to switch the laser pulses on and off to facilitate accurate tool path geometry. Embodiments of this invention optionally use an infrared (IR) camera to detect the temperature of articles being marked to determine tool paths.

An embodiment of this invention uses an optical switch to turn the laser beam on and off without requiring the laser to be turned on and off. An embodiment of this invention employs an AOM to modulate the fluence of the laser beam by diffractively redirecting the laser beam from its normal path to a beam dump where the laser beam energy is harmlessly dissipated rather than be directed to the article surface. An AOM is used because it is capable of modulating the laser beam very quickly. Fast modulation is advantageous for embodiments of this invention because it allows the laser marking system to turn the laser beam on and off rapidly and accurately without disturbing the laser itself.

Figure 6:
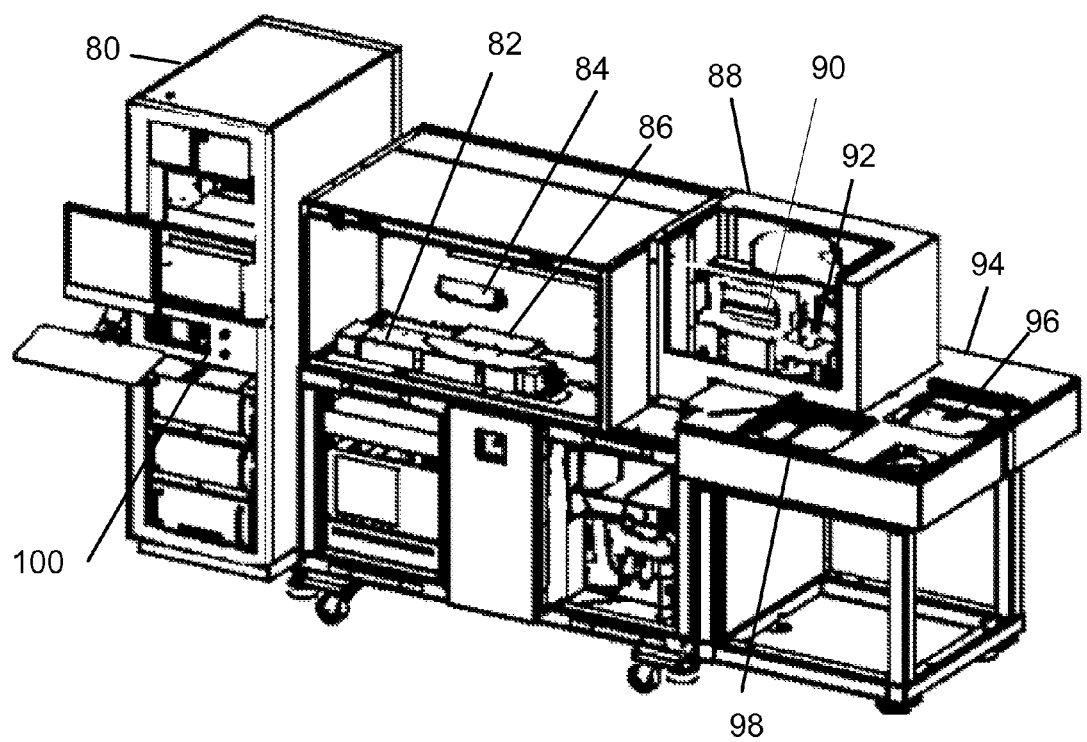

FIG. 6 shows a diagram of an adapted ESI Model ML5900 laser micromachining system 80 adapted for marking articles as an embodiment of the instant invention. Adaptations include a laser 82, an AOM 84 fluence attenuator and a diffractive beam shaper 86. Laser pulses are emitted by the laser 82 and directed by a series of mirrors and other optical elements (not shown) to the beam shaper 86 and AOM 84, and thereafter directed by another series of mirrors and optical elements (not shown) to the optical head 88. The optical head includes the X, Y and Z motion control elements 90 and the galvanometer block 92. These elements combine to position the laser beam (not shown) with respect to the article 98 being marked to create the 2 dimensional representation of the mark on the surface of the article 98. The article 98 is fixtured by the rotary stage element 94 which indexes the article 98 from the load/unload position to a position beneath the optical head 88 (not shown), where it is marked, and then to an optional inspection station 96 where it is inspected prior to indexing back to the load/unload station for unloading. All of these operations take place under the control of the controller 100, which coordinates the operation of the laser 82, the AOM 84, the motion control elements 90, the galvanometer block 92 and the rotary stage 94 to direct the appropriate laser fluence to the appropriate locations on the article 96 to create a mark with commercially desirable appearance.

The adapted laser 82 is a diode pumped Nd:YVO$_4$ solid state laser operating at a frequency tripled 355 nm wavelength, model Vanguard manufactured by Spectra-Physics, Santa Clara, Calif. 95054. The laser 82 is configured to yield up to 2.5 W, but is generally run at an 80 MHz mode locked pulse repetition rate which yields a power of about 1 W. Lasers with power of 0.5 Watts to 100 Watts or more preferably 0.5 Watts to 12 Watts may be used advantageously by embodiments of this invention. Laser repetition rates of 10 KHz to 500 MHz or more preferably 1 MHz to 100 MHz may be used. The laser 82 produces laser pulses with duration of about 1 picosecond to 1,000 nanoseconds or more preferably 100 picoseconds to nanosecond to 100 nanoseconds in cooperation with controller 100. Pulse temporal and spatial distributions are typically Gaussian. Motion control elements 90 and galvanometer block 92 combine to provide beam positioning capability with respect to the article. Embodiments of this invention use laser spots as measured on the article ranging from 5 microns to 500 microns, or more preferably in the range from 10 microns to 100 microns. The system uses beam speeds, or relative motion between the laser beam and the article in the range of 10 mm/s to 1 m/s, or more preferably in the range of 50 mm/s to 500 mm/s. The pitch, or spacing between adjacent lines of laser pulses can range from 1 micron to 250 microns, or more preferably in the range from 10 microns to 50 microns.

An embodiment of this invention uses a diffractive beam shaper optics to alter the typical Gaussian spatial profile of the laser beam to a "top hat" shape, wherein the distribution laser power is equalized over the laser spot area. This provides improved performance over the typical Gaussian beam profile since the top hat laser fluence is equal over the area of the focal spot and therefore material removal and damage thresholds are equal over the entire spot. With a Gaussian profile, assuming that the ablation threshold is exceeded at some point on the profile, the focal spot area within the ablation threshold area will exceed the ablation threshold possibly causing damage while the area of the focal spot outside the ablation threshold will not remove material. Use of diffractive optical elements in micromachining is disclosed in U.S. Pat. No. 6,433,301, inventors Corey M. Dunsky, Xinbing Liu, Nicholas J. Croglio, Ho W. Lo, Bryan C. Gundrum and Hisashi Matsumoto, Aug. 13, 2002 which is assigned to the assignee of this invention and included in its entirety by reference.

Figure 7:
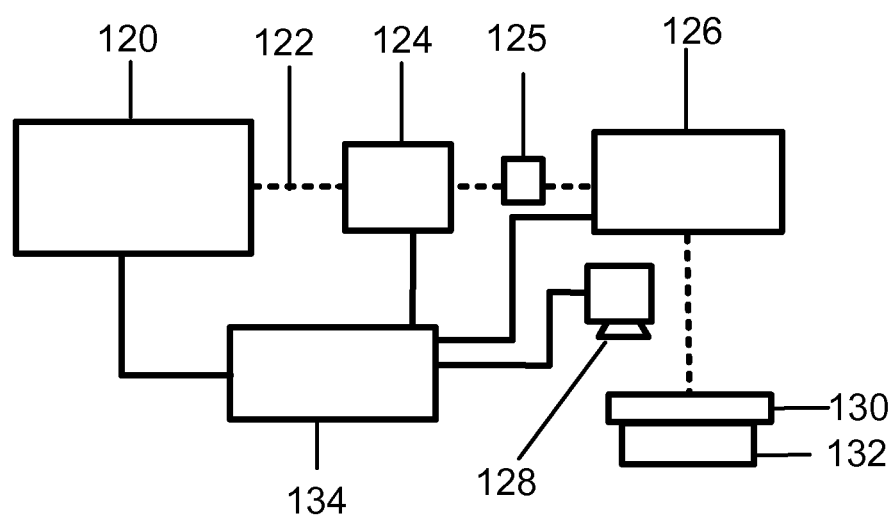

An embodiment of this invention shown in FIG. 7 adds real time feedback adaptations to a laser marking system to permit the adapted system to create marks with commercially desirable appearance by supplementing pre-calculation of laser fluences with real time acquisition of IR information from the article as it is being marked. In the embodiment shown in FIG. 7, a laser 120 emits a laser beam 122 which is directed to an optical switch 124, in this case an AOM, through the diffractive optics 125 and then to the beam steering optics 126, in this case a galvanometer block comprising two galvanometers set at right angles and arranged to guide the laser beam 122 in programmable X, Y patterns on the surface of the article 130. The article to be marked 130 is fixtured on the motion control stage 132 which cooperates with the beam steering optics 126 to direct the laser beam 122 in programmable patterns on the article's 130 surface. An infrared (IR) sensor 128 is adapted to sense the temperature of the surface of the article 130 as it is being marked by the laser beam 122. In this way, the temperature of the portion of the article's 130 surface to be marked next can be measured by the IR sensor 128 and communicated to the controller 134, which calculates the optimal fluence to use based on the measured temperature of the article 130 and directs the laser 120, optical switch 124, diffractive optics 125, beam steering optics 126 and motion control stages 132 to cooperate in directing the laser beam 122 to the article 130 with the proper fluence at the proper locations to create marks with commercially desirable appearance. An exemplary IR sensor that may be used by embodiments of this invention is the Model IR-TCM 640 manufactured by Jenoptik, Jena, Germany.

It will be apparent to those of ordinary skill in the art that many changes may be made to the details of the above-described embodiments of this invention without departing from the underlying principles thereof. The scope of the present invention should, therefore, be determined only by the following claims.

We claim:

1. A method for creating a laser mark on a specimen comprising:
providing a laser marking system configured to direct a laser beam onto a specimen in accordance with at least one controllable laser parameter;
during a first time period, controlling said laser marking system to direct said laser beam onto a first portion of said specimen to mark said first portion of the specimen according to said at least one controllable laser parameter and generate heat within a second portion of said specimen adjacent to said first portion; and
during a second time period in which said second portion at least partially retains the heat generated during the said first time period, controlling said laser marking system to adjust said at least one controllable laser parameter and direct said laser beam onto said second portion of said specimen to mark said second portion of the specimen.

2. The method of claim 1 wherein said specimen is coated with first and second layers of applied coatings, the method further comprising removing said first layer without damaging said second layer.

3. The method of claim 1 wherein said laser marking system has a controllable laser fluence in a range from $1.0 \times 10^{-6}$ Joules/cm$^2$ to 1.0 Joules/cm$^2$.

4. The method of claim 1 wherein said at least one controllable laser parameter includes pulse duration.

5. The method of claim 1 wherein said at least one controllable laser parameter includes pulse repetition rate.

6. The method of claim 1 wherein said at least one controllable laser parameter includes spot size.

7. The method of claim 1 wherein said at least one controllable laser parameter includes laser beam speed.

8. The method of claim 1, wherein an appearance of said mark across said first and second portions of said specimen is uniform.

9. A laser marking apparatus adapted to mark a specimen wherein said apparatus comprises:
a laser marking system operative to direct a laser beam onto a specimen at a controllable laser fluence; and
a controller configured to control an operation of the laser marking system such that:
during a first time period, said laser beam is directed onto a first portion of said specimen at a first laser fluence to mark said first portion of the specimen and generate heat within a second portion of said specimen adjacent to said first portion; and
during a second time period, said laser beam is directed onto said second portion of said specimen at a second laser fluence different from said first laser fluence while said second portion retains at least a portion of said generated heat to mark said second portion of the specimen.

10. The apparatus of claim 7 wherein said laser marking system includes an optical switch.

11. The apparatus of claim 10 wherein said optical switch is an acousto-optic modulator.

12. The apparatus of claim 7 wherein said laser marking system includes a diffractive beam shaper.

13. A method for creating a laser mark on a specimen comprising:
providing a laser marking system having controllable laser fluence and an infrared sensor;
measuring the temperature of a portion of said specimen with said infrared sensor;
determining a laser fluence associated with creating said laser mark on said portion of said specimen based on said measured temperature of said portion of said specimen; and
directing said laser marking system to mark said portion of said specimen using said determined laser fluence.

14. The method of claim 13 wherein said laser fluence ranges from $1.0 \times 10^{-6}$ Joules/cm$^2$ to 1.0 Joules/cm$^2$.

15. The method of claim 13 wherein said controllable laser fluence is controlled by an optical switch.

16. The method of claim 15 wherein said optical switch is an acousto-optic modulator.

17. The method of claim 13 wherein said laser marking system includes a diffractive beam shaper.

18. A method for creating a laser mark on a specimen comprising:
providing a laser marking system having controllable laser fluence and an infrared sensor;
measuring the temperature of a portion of said specimen with said infrared sensor;
determining a laser fluence associated with creating said laser mark on said portion of said specimen; and
directing said laser marking system to mark said specimen using said determined laser fluence thereby marking said specimen,
wherein said specimen is coated with first and second layers of applied coatings and marking specimen comprises removing said first layer without damaging said second layer.

* * * * *